Patented Oct. 2, 1951

2,569,455

UNITED STATES PATENT OFFICE 2,569,455

MAKING FURFURYL SILICATE

James B. Culbertson, Lockport, Hendrik de W. Erasmus, Lewiston, and Robert M. Fowler, Niagara Falls, N. Y., assignors to Union Carbide and Carbon Corporation, a corporation of New York No Drawing. Application June 8, 1949,
Serial No. 97,925

1 Claim. (Cl. 260—345)

This invention relates to a novel method for making furfuryl silicate.

In accordance with the invention furfuryl silicate is prepared by reacting silicon disulfide (SiS$_2$) with furfuryl alcohol. The reaction proceeds according to the following equation:

$$4C_4H_3O.CH_2OH + SiS_2 \rightarrow (C_4H_3O.CH_2O)_4Si + 2H_2S$$

In an example of how the novel method was performed, furfuryl alcohol was allowed to filter slowly through a tube containing silicon disulfide at room temperature. A furfuryl silicate liquid product containing about 8.8% silicon was obtained.

The reaction of the invention can be carried out with substantially pure silicon disulfide, or with silicon disulfide diluted with other materials. For example the so-called annealed silicon monosulfide, which is a mixture of silicon and silicon disulfide, has been used successfully. This is the product obtained by condensing silicon monosulfide vapor slowly, or by heating silicon monosulfide below its volatilization temperature until it changes into a mixture of silicon and silicon disulfide.

What is claimed is:

A method for making furfuryl silicate which comprises reacting silicon disulfide with furfuryl alcohol.

JAMES B. CULBERTSON.
HENDRIK DE W. ERASMUS.
ROBERT M. FOWLER.

REFERENCES CITED

The following references are of record in the file of this patent:

UNITED STATES PATENTS

| Number | Name | Date |
|---|---|---|
| 2,300,812 | Rust | Nov. 3, 1942 |

OTHER REFERENCES

Fremy, Am. Chim. Phys., series 3, vol. 38 (1852), p. 318.